(12) United States Patent
Rogers et al.

(10) Patent No.: US 7,389,750 B1
(45) Date of Patent: Jun. 24, 2008

(54) QUICK CONNECT TETHER CONNECTING SYSTEM

(76) Inventors: Anthony R. Rogers, 29 Friends La., Newtown, PA (US) 18940; Paul Boxmeyer, 29 Friends La., Newtown, PA (US) 18940

( * ) Notice: Subject to any disclaimer, the term of this patent is extended or adjusted under 35 U.S.C. 154(b) by 159 days.

(21) Appl. No.: 11/267,542

(22) Filed: Nov. 7, 2005

(51) Int. Cl.
*A01K 27/00* (2006.01)

(52) U.S. Cl. .................................................. 119/792

(58) Field of Classification Search ......... 119/769–772, 119/774, 776–778, 792, 795, 850, 856, 863–865
See application file for complete search history.

(56) References Cited

U.S. PATENT DOCUMENTS

| | | | | |
|---|---|---|---|---|
| 3,589,341 A | | 6/1971 | Krebs | 119/106 |
| 6,003,474 A | * | 12/1999 | Slater et al. | 119/859 |
| 6,308,662 B1 | * | 10/2001 | Furman | 119/776 |
| 6,499,437 B1 | | 12/2002 | Sorensen et al. | 119/792 |
| 6,629,511 B2 | * | 10/2003 | De Bien | 119/776 |
| 6,948,218 B1 | * | 9/2005 | Donze | 24/265 H |
| 6,955,138 B2 | * | 10/2005 | DeBien | 119/776 |
| 7,162,978 B2 | * | 1/2007 | Debien | 119/772 |

* cited by examiner

*Primary Examiner*—Thomas Price
(74) *Attorney, Agent, or Firm*—LaMorte & Associates

(57) ABSTRACT

A leash and collar system for a pet, having a unique coupling that can be quickly attached and detached with one hand, even while the coupling is pulled in tension. The coupling has a female section and a male section that selectively interconnect. The female section defines a receptacle for receiving the male section. A magnet is disposed within the receptacle at its base. The male section has an internal plunger element that selectively moves between a forward position and a rearward piston. When the male section is inserted into the female section, the plunger element is magnetically attracted to the magnet in the receptacle. The magnet pulls the plunger element into its forward position. Locking elements protrude from the male section when the internal plunger element is in its forward position. The locking elements prevent the male section from being retracted out of the receptacle.

15 Claims, 5 Drawing Sheets

QUICK CONNECT TETHER CONNECTING SYSTEM

BACKGROUND OF THE INVENTION

1. Field of the Invention

In general, the present invention relates to connectors that are used to connect and disconnect tethers, such as dog leashes and boat mooring ropes. More particularly, the present invention relates to the connection mechanism used to selectively join a flexible tether to a secondary object.

2. Prior Art Description

There are many instances where a tether has to be selectively attached or detached from a secondary object. For instance, boats have to be connected and disconnected from docks. Cargo straps have to be attached and detached to cargo on the bed of a truck. However, most people encounter the need to attach and detach flexible tethers when they deal with animal restraints.

Many animals are kept as pets. Often a pet owner many want to restrain the movement of the pet so that the pet does not leave a confined area or leave the control of the pet owner. It is for these reasons that harnesses and collars have been made for pets. Harnesses and/or collars have been manufactured for almost every kind of animal ever kept as a pet. These harnesses/collars can be attached to leashes or other tethers to restrict the movement of the animal.

In modern society, common house pets are dogs and cats. Dogs and cats are typically retrained using a collar that is worn by the pet around its neck. The collar typically has a loop structure at some point that enables a leash to be attached to the collar.

Pets, especially dogs, come in a large variety of breeds. Some dogs weigh only a few pounds. Other breeds of dogs can weigh more than their owners. As such, it will be understood that in order to properly restrain a dog, especially a large dog, a very strong connection must be maintained between the collar of the dog and the leash restraint. Dogs also have the ability to shake their collars and paw at their collars. Thus, any connection made between a collar and a leash must be able to withstand forces applied in any direction and in rapidly changing directions.

The most popular connector used to attach a leash to an animal collar is a spring hook. A spring hook is a hooked structure having an open eye. A spring biased pawl obstructs the access into the eye. The spring biased pawl must therefore be manipulated out of the way before the open eye of the hook structure can receive a loop. A problem associated with spring hook connectors is that they are difficult to attach and detach using only one hand. Such spring hooks are also particularly difficult to attach and detach if the dog is pulling on the collar and the spring hook connector is in tension.

In the prior art, many designs have been created that attempt to improve the ease with which a person can attach a leash to a collar. Some of these prior art connectors utilize magnetic attraction. For instance, in U.S. Pat. No. 3,589,341 to Krebs, entitled Animal Collar With Magnetic Fastener, a coupling is shown that closes using magnetic attraction. Such a collar coupling is very easily closed. However, should an animal pull on the collar with any force greater than the forces of the attracting magnets, the connector will open. Thus, the collar is limited to small animals, such as cats and miniature dogs.

U.S. Pat. No. 6,499,437 to Sorensen, entitled Magnetic Connector, discloses a connector for a leash that uses magnets to align mating mechanical parts. The mating mechanical parts bear the forces between the collar and leash that are applied in tension. However, the mating mechanical parts only bear those tension forces applied in certain directions. The magnetic interconnection is relied upon for holding the connection closed if the leash is not in tension, or if tension is applied in an awkward direction. The connector is therefore easily undone if an animal were to rapidly shake its collar or paw at the connection.

The present invention provides a connector for use between a collar and a leash that utilizes magnetic forces to create a rapid alignment and interconnection of opposing parts. However, once interconnected, a mechanical connection maintains the interconnection, wherein the mechanical connection is equally strong regardless of the direction of the forces being applied. In this manner, a connector is provided that can be rapidly opened and closed with one hand, yet is far more reliable than prior art connectors in the same class. The present invention connector is described and claimed below.

SUMMARY OF THE INVENTION

The present invention is a tether connecting system having a unique coupling that can be quickly attached and detached with one hand, even while the coupling is pulled in tension. The coupling has a female section and a male section that selectively interconnect. The female section defines a receptacle for receiving the male section. A magnet is disposed within the receptacle at its base.

The male section has an internal plunger element that selectively moves between a forward position and a rearward piston. When the male section is inserted into the female section, the plunger element is magnetically attracted to the magnet in the receptacle. The magnet pulls the plunger element into its forward position.

Locking elements protrude from the male section when the internal plunger element is in its forward position. The locking elements prevent the male section from being retracted out of the receptacle when protruding. Thus, when the male section is inserted into the receptacle of the female section, the magnet pulls the internal plunger element into its forward position. This causes the locking elements to protrude and locks the male section within the structure of the female section.

To release the coupling, the internal plunger element is simply moved to its rearward position. Once done, the locking elements retract and the male section is released from the female section.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention connector assembly can be used as the termination connector of any length of flexible tether, such as a backpack strap, a tarp tie down, a mooring rope, or the like, the present invention connector assembly is particularly well suited for use in connecting a leash to an animal's collar. Accordingly, by way of example, the present invention connector assembly will be embodied as part of a collar and leash system in order to set forth the best mode contemplated for the invention. However, the illustrated use of the present invention connector assembly is intended to only be exemplary and should not be considered a limitation to the application of the present invention to other tether connecting systems.

Figure 1:
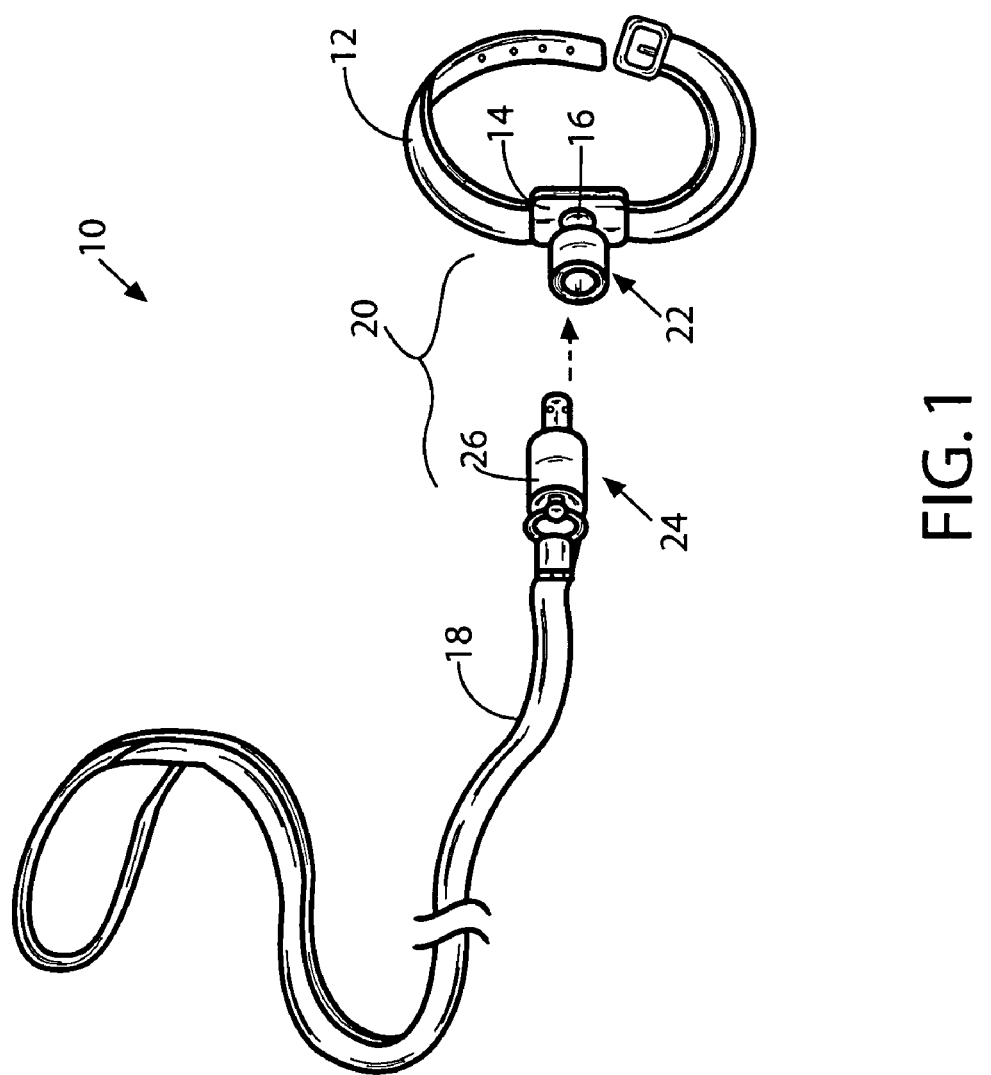
FIG. 1 is a perspective view of an exemplary embodiment of a tether connection system embodied as a leash and collar assembly for a pet.

Referring to FIG. 1, there is shown a leash and collar system 10 for a pet, such as a dog. The collar 12 is a standard collar and can have any known construction. A segment 14 of the collar 12 is reinforced and contains a female subassembly 22 of a unique connector assembly 20. The female subassembly 22 of the connector assembly 20 is affixed to the reinforced segment 14, preferably with a ball and socket joint 16. In this manner, the female subassembly 22 is free to move throughout a large range of orientations with respect to the remainder of the collar 12.

A leash 18 is provided that terminates with a male subassembly 24 of the same connector assembly 20. A slide 26 is present on the male subassembly 24 of the connector assembly 20. The slide 26 is used to selectively disconnect the male subassembly 24 of the connector assembly 20 with the female subassembly 22 of the connector assembly 20.

As will shortly be explained in more detail, the male subassembly 24 of the connector assembly 20 automatically engages the female subassembly 22 of the connector assembly 20 when the male subassembly 24 is inserted within the female subassembly 22. Thus, the male subassembly 24 can easily be connected to the female subassembly 22 with one hand. When the leash 18 is to be disconnected from the collar 12, the slide 26 on the male subassembly 24 of the connector assembly 20 simply has to be pulled back a fraction of an inch. This manipulation can be easily accomplished with one hand and is unaffected by the degree of tension between the leash 18 and the collar 12. Accordingly, even if a large dog is pulling on the leash 18, the leash 18 can be readily separated from the collar 12 with a simple one-handed manipulation.

Figure 2:
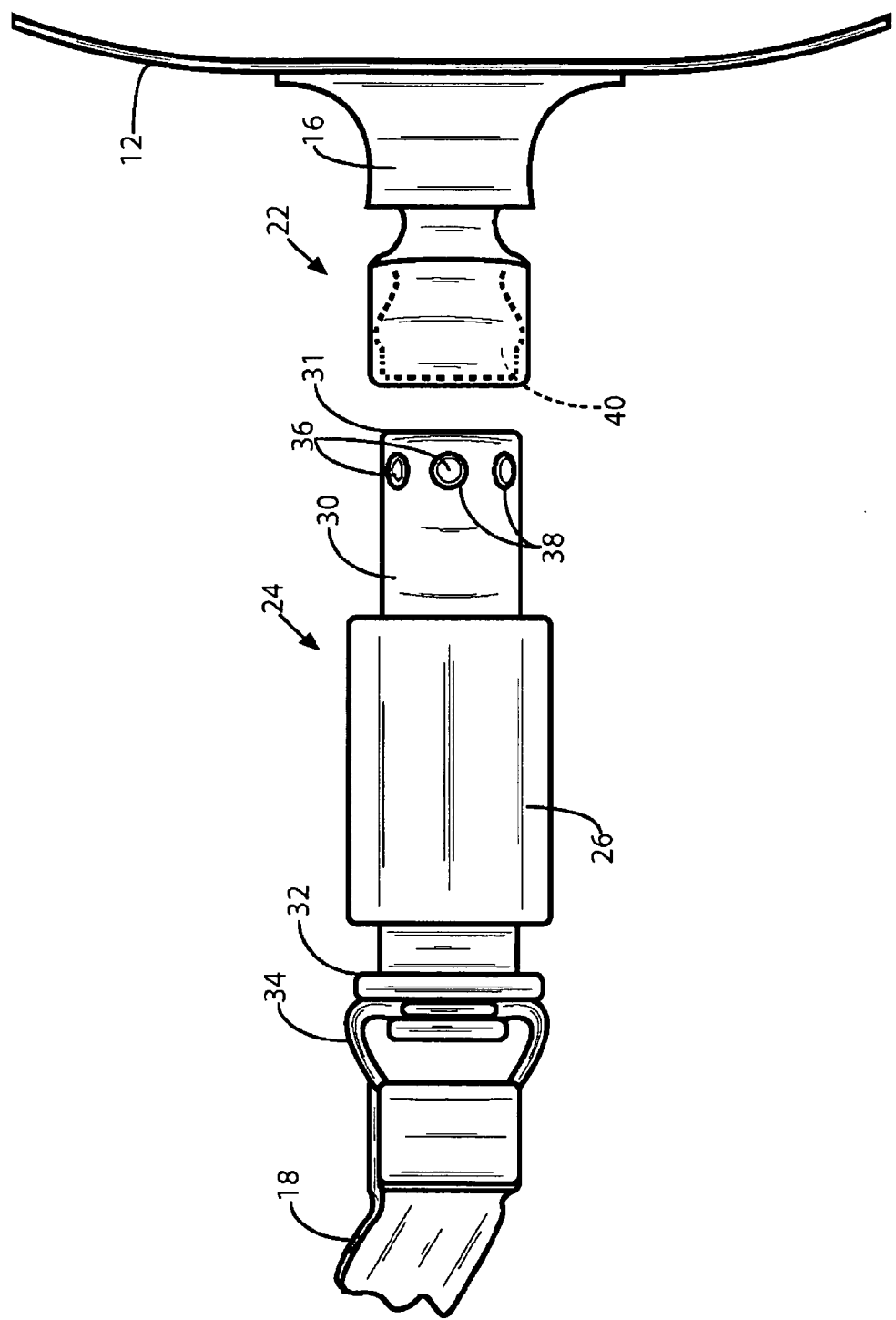
FIG. 2 is an enlarged view of the coupling of the leash and collar assembly.

Referring to FIG. 2 it can be seen that the male subassembly 24 of the connector assembly 20 has a tubular body 30. The tubular body 30 has a first end 31 and a second end 32. A loop structure 34 is coupled to the second end 32 of the tubular body 30. The loop structure 34 provides a means for the male subassembly 24 of the connector assembly 20 to be joined to a flexible leash 18. The loop structure 34 preferably is firmly anchored to the second end 32 of the tubular body 30. However, the loop structure 34 is free to rotate around the tubular body 30.

A plurality of ball bearings 36 are contained within the tubular body 30 of the male subassembly 24. Portions of the ball bearings 36 radially protrude out of holes 38 formed in the sides of the tubular body 30. The holes 38 and the ball bearings 36 are disposed proximate to the first end 31 of the tubular body 30. The ball bearings 36 radially protrude from the tubular body 30. Consequently, the diameter around the protruding ball bearings 36 is larger than the diameter of the tubular body 30.

The slide 26 is positioned around the tubular body 30 along the portion of the tubular body 30 that exists between its second end 32 and the ball bearings 36. When the slide 26 is moved along the length of the tubular body 30 toward the second end 32, the ball bearings 36 retract into the holes 38 and no longer protrude from the tubular body 30.

The female subassembly 22 of the connector assembly 20 is attached to the collar 12 with a ball and socket joint 16. The socket portion of the joint 16 is attached to the collar 12. The ball portion of the joint 16 is part of the female subassembly 22. A receptacle 40 is formed at the end of the female subassembly 22 opposite the ball and socket joint 16. The receptacle 40 receives and engages the first end 31 of the male subassembly 24.

Figure 3:
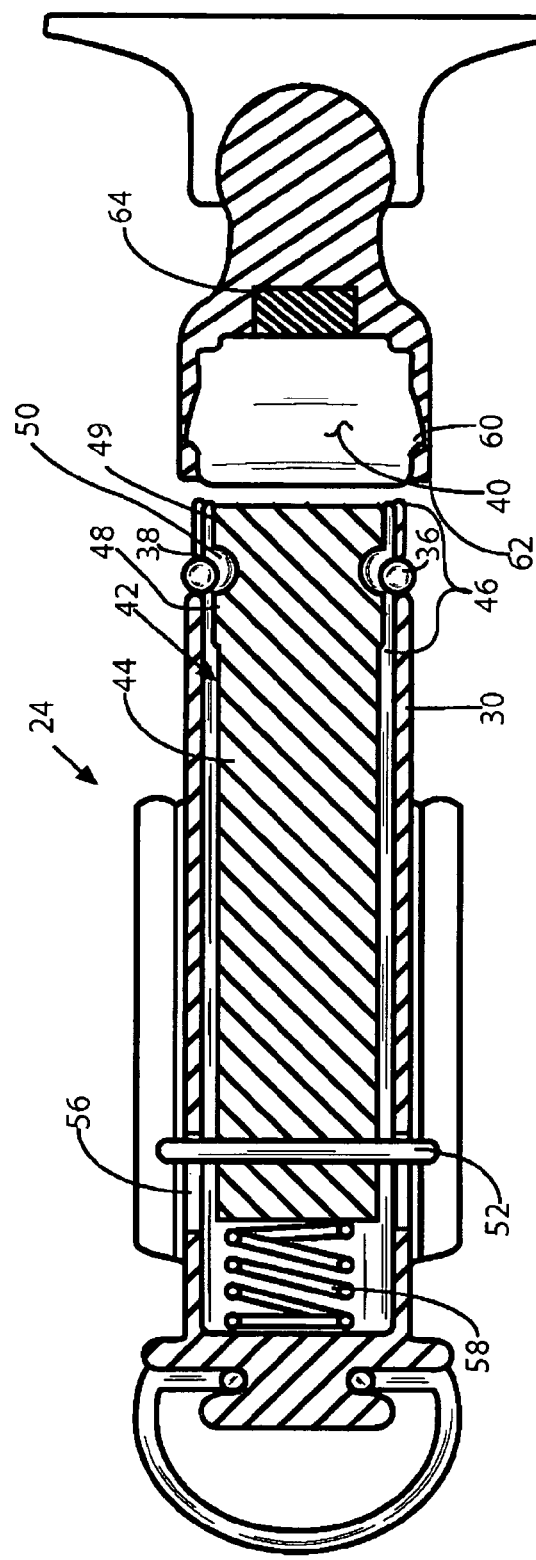
FIG. 3 is a cross-sectional view of the coupling shown in FIG. 2.

Referring now to FIG. 3, it can be seen that a plunger element 42 is present within the tubular body 30 of the male subassembly 24. The plunger element 42 has an elongated bolt 44 terminating in an enlarged head 46. The enlarged head 46 has a base section 48 and a tip section 49. A toric groove 50 is formed in the enlarged head 46 in between the base section 48 and the tip section 49. The toric groove 50 is sized to receive the ball bearings 36. The enlarged head 46 of the plunger element 42 is preferably made of a ferro-magnetic material, such as steel, that is strongly attracted to a magnet. Alternatively, the enlarged head 46 itself can be magnetized.

The plunger element 42 is positioned within the interior of the tubular body 30. The plunger element 42 is dimensioned so as to be free to move reciprocally between a forward position and a rearward position within the confines of the tubular body 30. The reciprocal movement of the plunger element 42 is limited by the presence of a first pin 52 and a second pin 65.

The first pin 52 extends through a receiving hole in the plunger element 42. The pin 52 passes through rear slots 56 formed in the sides of the tubular body 30. The first pin 52 engages the slide 26, thereby mechanically joining the plunger element 42 within the tubular body 30 to the slide 26 on the exterior of the tubular body 30. The length of the rear slots 56 in the sides of the tubular body 30 determine how far both the internal plunger element 42 and the external slide 26 can reciprocally travel in relation to the tubular body 30.

The second pin passes through a forward slot 66 that is formed in the front of the plunger element 42. The second pin 65 engages the tubular body 30, thereby providing a mechanical stop for a spring 58. The forward slot 66 allows for the unimpeded sliding movement of the plunger element 42 within the tubular body 30.

The spring 58 is disposed within the tubular body 30. The spring 58 is compressed between the first pin 52 and the second pin 65. The spring 58 therefore biases the plunger element 42 into the shown retracted position where the first pin 52 is held against the rear of the rear slots 56 and the second pin 65 is held against the front of the forward slot 66.

When the plunger element 42 is in its retracted position, such as is shown in FIG. 3, the toric groove 50 in the enlarged head 46 of the plunger element 42 aligns with the holes 38 in the sides of the tubular body 30. The result is that the ball bearings 36 can pass into the toric groove 50 and do not protrude out of the holes 38 to their maximum extent.

Also in FIG. 3, it can be seen that the female subassembly 22 defines an open receptacle 40. The diameter of the receptacle 40 is at its narrowest a short distance in from the rim 62 of the receptacle 40. Just below the narrowest region, the receptacle 40 sharply expands, creating a lip structure 60. Above the lip structure 60, the receptacle 40 tapers to the rim 62.

A magnet 64 is set into the bottom of the receptacle 40. The magnet 64 is preferably a rare earth magnet having a large, magnetic field-to-mass ratio. The remaining structure of the receptacle 40 is preferably made of a non-ferromagnetic material, such as brass or aluminum. In this manner, the magnet 64 will not magnetize any other part of the receptacle 40.

Figure 4:
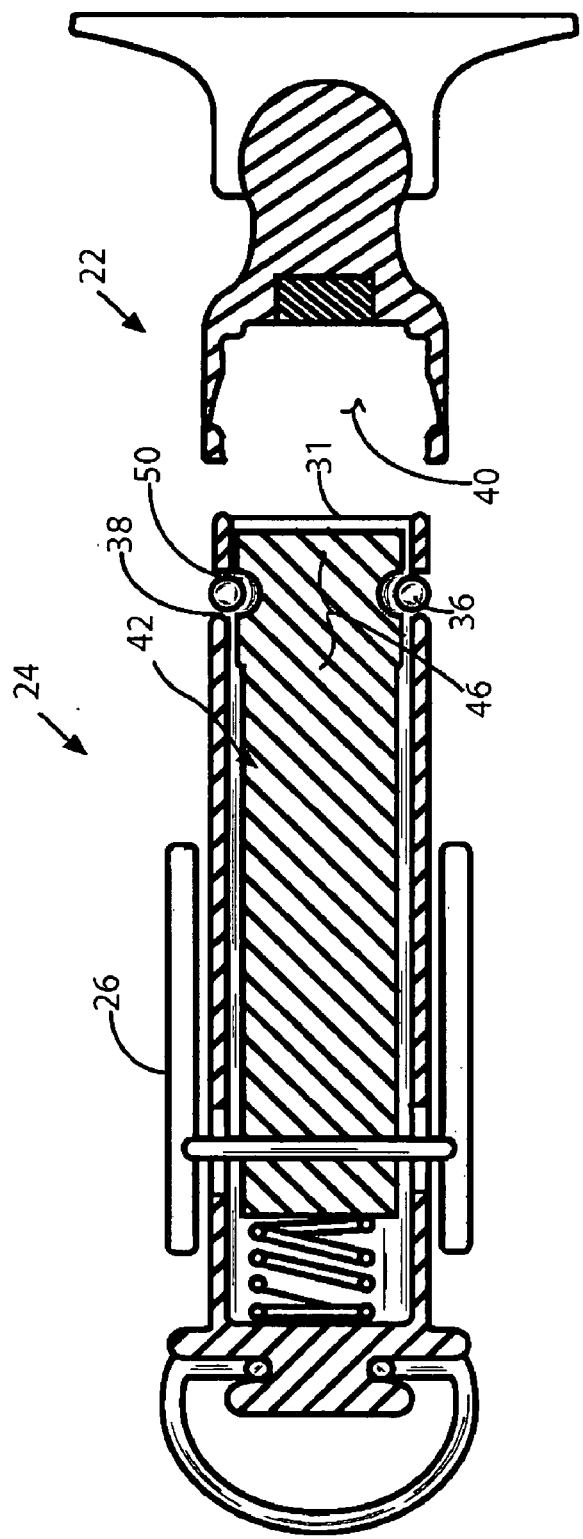
FIG. 4 is a cross-sectional view of the coupling shown in FIG. 2, wherein the coupling is engaged and the plunger element is in its open rearward position.

Referring now to FIG. 4, it can be seen that when the male subassembly 24 is about to be connected to the female subassembly 22, the slide 26 on the tubular body 30 is pulled back slightly. The plunger element 42 is pulled into its rearward position. This orients the toric groove 50 in the enlarged head 46 of the plunger element 42 to align with the ball bearing holes 38. The ball bearings 36 pass into the toric groove 50 and do not fully protrude outwardly from the tubular body 30. The first end 31 of the male subassembly 24 can then freely pass into the receptacle 40 of the female subassembly 22.

As the ball bearings 36 are advanced toward the lip structure 60 within the receptacle 40, the magnet 64 will begin to pull upon the enlarged head 46, thereby biasing the enlarged head 46 toward the magnet. Once in close proximity, the magnet 64 exerts sufficient magnetic force on the enlarged head 46 to overcome the extension force exerted by the spring 58 on the plunger element 42. The interconnection between the male subassembly 24 and the female subassembly 22 will then continue automatically.

Figure 5:
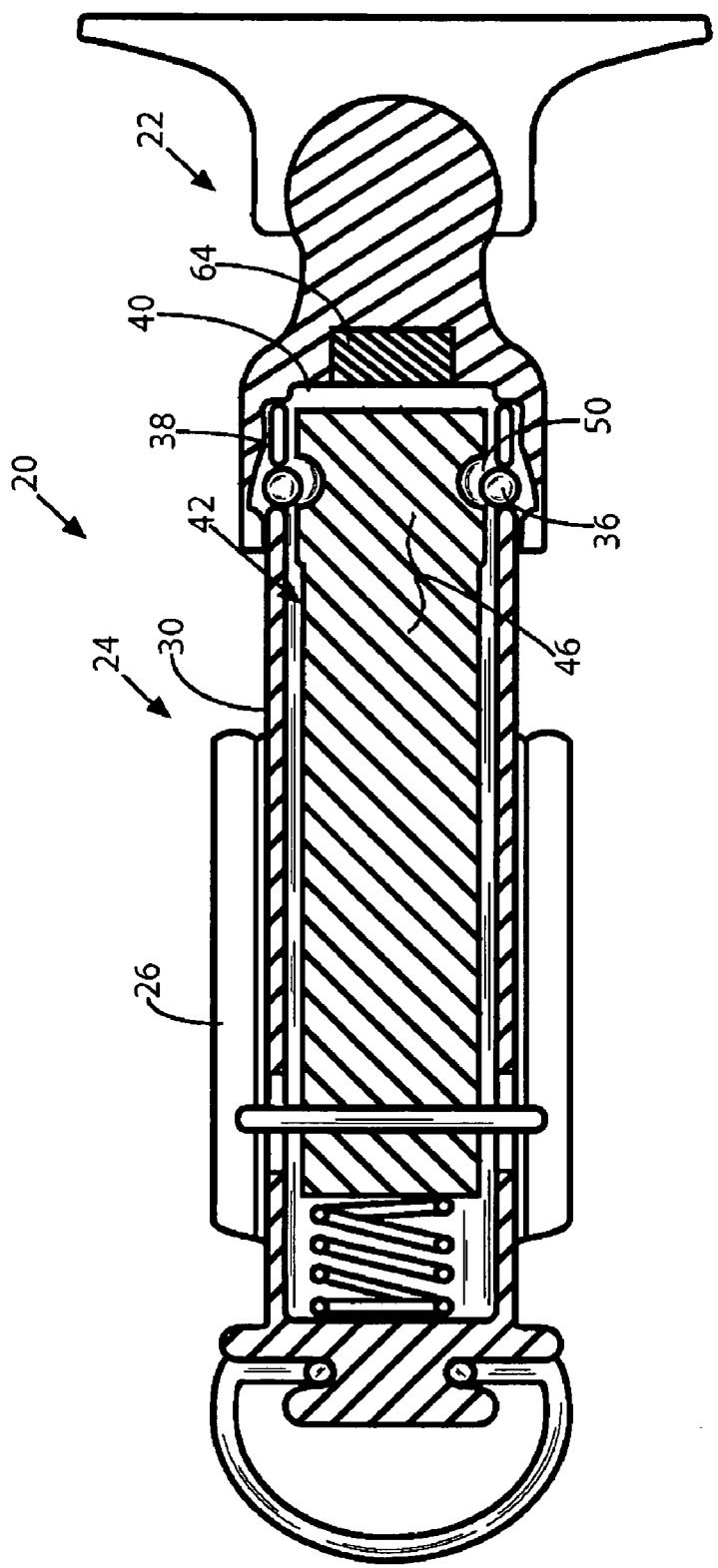
FIG. 5 is a cross-sectional view of the coupling shown in FIG. 2, wherein the coupling is engaged and the plunger element is in its locked forward position.

Referring to FIG. 5, it can be seen that the enlarged head 46 of the plunger element 42 will be magnetically drawn to the magnet 64 at the base of the receptacle 40. The enlarged head 46 is either ferro-magnetic or magnetized itself. The magnetic attraction causes the enlarged head 46 of the plunger element 42 to abut against the magnet 64. Once in this forward position, the plunger element 42 is pulled to its forward most point in the surrounding tubular body 30. This pulls the male subassembly 24 to its forward position, wherein the ball bearings 36 are partially displaced from the toric groove 50 and protrude fully from the holes 38 in the tubular body 30.

The protruding ball bearings 36 are wider than the narrowest section of the receptacle 40. The male subassembly 24 therefore becomes locked in place in full engagement with the female subassembly 22. This completes the interconnection between the male subassembly 24 and the female subassembly 22.

To disconnect the male subassembly 24 from the female subassembly 22, the slide 26 is manually pulled back. This causes the plunger element 42 to move backward within the tubular body 30 and reach the retracted position of FIG. 4. Once in this retracted position, the ball bearings 36 retract into the space of the toric groove 50 and then nothing prevents the movement of the male subassembly 24 out of the receptacle 40.

The male subassembly 24 can therefore be quickly disconnected from the female subassembly 22 by the simple manipulation of the slide 26. The disconnection occurs regardless of whether the overall connector assembly 20 is in tension or not.

It will be understood that the embodiment of the present invention connector assembly 20 is merely exemplary and that an expert in the field can make many variations to that embodiment. For instance, the size and shape of components, such as the slide, tubular body, and plunger element can be altered. The spring used to bias the plunger element can be positioned differently than is illustrated. The number of ball bearings used can be altered. All such alternate embodiments, variations and modifications are intended to be included within the scope of the present invention as defined by the claims.

What is claimed is:

1. An assembly comprising:
   a leash;
   a collar;
   a connector for selectively joining said leash to said collar, said connector having a male section and a female section that create a mechanical interconnection when said male section is inserted into said female section to a locking position;
   said male section of said connector including,
      a tubular body having at least one hole;
      a plunger element disposed within said tubular body that can be selectively moved between a forward position and a rearward position within said tubular body;
      at least one ball bearing disposed between said tubular body and said plunger element, wherein said ball bearing is biased into said hole in said tubular body to a protruding position when said plunger element is in said forward position;
   at least one magnet disposed within said female section that magnetically attracts said plunger element into said forward position within said housing when said male section of said connector is inserted into said locking position within said female section; and
   a release disposed on said connector that selectively releases said mechanical interconnection while said male section is still within said locking position, thereby enabling said male section to be retracted from said locking position.

2. The assembly according to claim 1, wherein said connector is joined to said collar with a ball and socket joint.

3. The assembly according to claim 1, wherein said male section has an exterior surface and said release is a slide, positioned around a section of said exterior surface, that reciprocally moves along said exterior surface.

4. The assembly according to claim 1, wherein said release causes said plunger element to retract out of said forward position when said release is manipulated.

5. The assembly according to claim 1, wherein said plunger element has at least one section that is magnetic, wherein said plunger element is biased into said forward position by said at least one magnet in said female section when said male section is inserted into said female section.

6. The assembly according to claim 1, wherein said male section of said connector further includes a spring that biases said plunger element into said forward position.

7. The assembly according to claim 1, wherein said release is directly coupled to said plunger element whereby physical movement of said release causes a corresponding movement in said plunger element.

8. A connector assembly, comprising:
   a male section having a housing and an internal plunger element that can be selectively moved between a forward position and a rearward position within said housing;
   a plurality of locking elements contacting said internal plunger element within said housing, wherein said internal plunger element causes said locking elements to protrude from said housing when said internal plunger element is in said forward position;
   a female section defining a receptacle that receives a portion of said housing therein, wherein said male section becomes mechanically locked within said receptacle when said locking elements protrude from said housing; and
   a magnet disposed within said female section that attracts said internal plunger element and biases said internal plunger element into said forward position when said housing is received within said female section.

9. The assembly according to claim 8, further including a release coupled to said internal plunger element enabling said internal plunger element to be manually manipulated between said forward position and said rearward position.

10. The assembly according to claim 8, further including a spring for biasing said plunger element into said rearward position.

11. The assembly according to claim 8, wherein said locking elements are ball bearings that radially protrude from said male section when said internal plunger element is in said forward position.

12. A coupling, comprising:

a receptacle having a magnet disposed therein;

a male connector having a housing and an internal plunger element disposed within said housing, wherein said plunger element can selectively move between a forward position and a rearward piston inside said housing, wherein said plunger element is magnetically attracted to said magnet and wherein said magnet pulls said plunger element into said forward position within said housing when said male connector is inserted into said receptacle;

locking elements that protrude from said housing of said male connector when said internal plunger element is in said forward position, wherein said locking elements prevent said male connector from being retracted out of said receptacle when protruding.

13. The coupling according to claim 12, further including a release coupled to said internal plunger element enabling said internal plunger element to be manually manipulated between said forward position and said rearward position.

14. The assembly according to claim 12, further including a spring for biasing said plunger element into said forward position.

15. The assembly according to claim 12, wherein said locking elements are ball bearings that radially protrude from said male connector when said internal plunger element is in said forward position.

* * * * *